United States Patent [19]
Pavlin

[11] Patent Number: 5,729,443
[45] Date of Patent: Mar. 17, 1998

[54] SWITCHED CURRENT REGULATOR WITH IMPROVED POWER SWITCH CONTROL MECHANISM

[75] Inventor: Antoine Pavlin, Puyricard, France

[73] Assignee: SGS-Thomson Microelectronics S.A., Saint Genis, France

[21] Appl. No.: 534,497

[22] Filed: Sep. 27, 1995

[30] Foreign Application Priority Data

Sep. 30, 1994 [FR] France ............... 94 11973

[51] Int. Cl.⁶ ............................................. H02M 3/335
[52] U.S. Cl. ............................................. 363/21; 363/97
[58] Field of Search ........................... 363/20, 21, 97, 363/131

[56] References Cited

U.S. PATENT DOCUMENTS

| | | | |
|---|---|---|---|
| 4,600,984 | 7/1986 | Cohen | 363/97 |
| 4,864,480 | 9/1989 | Melcher | 363/21 |
| 4,908,755 | 3/1990 | Feldtkeller | 363/56 |
| 4,939,632 | 7/1990 | Plagge | 363/19 |
| 5,086,382 | 2/1992 | Feldtkeller et al. | 363/21 |
| 5,218,521 | 6/1993 | Avgier | 363/21 |
| 5,291,386 | 3/1994 | Wu | 363/21 |
| 5,412,556 | 5/1995 | Marinus | 363/12 |
| 5,513,089 | 4/1996 | Sudo et al. | 363/21 |

*Primary Examiner*—Jeffrey L. Sterrett
*Attorney, Agent, or Firm*—Wolf, Greenfield & Sacks, P.C.; James H. Morris

[57] ABSTRACT

A flyback-type switched current regulator, comprising first and second coupled windings and a circuit for connecting the first winding to a voltage source as soon as the windings are demagnetized. The regulator further comprises a current sensor that senses the current flowing through the first winding; a switch that disconnects the first winding from the voltage source when the first current in the first winding reaches a reference value, whereby the first winding is switched according to a duty cycle; and a circuit that varies the reference value in accordance with the duty cycle.

36 Claims, 3 Drawing Sheets

1

SWITCHED CURRENT REGULATOR WITH IMPROVED POWER SWITCH CONTROL MECHANISM

BACKGROUND OF THE INVENTION

1. Field of the Invention

The present invention relates to switched regulators providing a constant current to a load, for example a battery, with a high efficiency. The present invention more particularly relates to a switched current regulator whose charge should be isolated from the supply source of the regulator, frequently the 220-volt mains.

2. Discussion of the Related Art

FIG. 1 represents a conventional switched regulator. In this example, the conventional switched regulator is accumulation regulator or "flyback" regulator. Two windings 11 and 12 coupled through a magnetic core 13, but galvanically isolated, are provided for isolating the load $R_L$ from the regulator. The first winding 11 is connected to the voltage source $V_1$ through a power switch S. Although the first winding 11 and second winding 12 do not constitute a transformer (currents do not simultaneously flow through the two windings), the terminology "first" and "second" is used for the sake of simplification of the description. The second winding 12 is connected to load $R_L$ through a diode D. A filtering capacitor C is connected in parallel to load $R_L$. The diode D is connected so that no current flows through the load while the first winding 11 is connected to voltage $V_1$.

When switch S is switched on, the first current $I_1$ in the first winding 11 increases from an initial value, as a function of the values of voltage $V_1$ and of the inductance provided by the first winding 11. During this time, the second current $I_2$ in the second winding 12 is zero and the power is stored in the core 13.

When switch S is switched off, the first current $I_1$ is abruptly switched off and the power that was just stored in core 13 is transferred into the second winding 12. The second current $I_2$ abruptly reaches a peak value equal to the peak current reached by the first current $I_1$ multiplied by the ratio between the number of turns of the first winding 11 and the second winding 12, when the switch S is switched off. The second current $I_2$ starts to decrease as a function of the inductance of the second winding 12 and of the voltage across load $R_L$.

Switch S is again switched on when the second current $I_2$ has reached a generally undetermined final value. This final value, that may have been zero since a determined time, determines the initial value from which the first current $I_1$ starts to increase.

The amount of power transferred from the first winding 11 to the second winding 12 depends upon the switching duty cycle of switch S, i.e., the ratio between its on time and the switching duration.

To regulate the mean current in the load, a resistor Rs is serially connected to the second winding 12. The voltage across resistor Rs is provided to a regulation circuit 15 which controls switch S. This regulation circuit filters the voltage across resistor Rs to extract therefrom the mean value which is compared with a reference value. The duty cycle of switch S is adjusted so that the mean voltage across resistor Rs (therefore the mean second current) approaches the reference value.

A drawback of switched regulators with galvanic isolation between the first winding 11 and the second winding 12, such as the one represented in FIG. 1, lies in the fact that the value to be measured (current, voltage) is found in the section of the regulator housing the second winding 12 whereas the element for adjusting this value, the power switch S, is found in the section of the regulator housing the first winding. As illustrated by dotted lines 16, a galvanic isolation should be provided in the regulation circuit 15, between the portion measuring the voltage across resistor Rs and the portion controlling switch S. This isolation is achieved, for example, via a transformer or a photocoupler. Transformers are expensive and bulky whereas photocouplers are expensive and unreliable over time (many failures in present regulators are caused by photocouplers).

Of course, it could be devised to regulate the mean current in the first winding 11, but this approach causes a regulation of the mean power provided to load $R_L$ and not of its mean current which then varies as a function of the supply voltage $V_1$ and of the output voltage across the load.

SUMMARY OF THE INVENTION

An object of the present invention is to provide a switched current regulator whose regulation circuit is entirely accommodated on the side of the power switch, i.e., the circuit is not connected to the second winding and does not need any isolation element.

To achieve this object, the present invention uses a flyback-type switched current regulator comprising a first winding, a second winding coupled to the first winding, a current sensor coupled to the first winding, a connecting means, a disconnecting means and a varying means coupled to a supply voltage. The current sensor senses a first current flowing through the first winding and outputs a current sensor signal. The connecting means connects the first winding to a voltage source when a second current flowing through the second winding is substantially zero. The disconnecting means disconnects the first winding from the voltage source when the first current flowing through the first winding is greater than or equal to a reference value. The first winding is connected and disconnected from the voltage source according to a switching duty cycle. The varying means varies the reference value, corresponding to a duration of the switching duty cycle.

In another illustrative embodiment of the invention, a switched current regulator is provided comprising a first winding, a second winding coupled to the first winding, a current sensor coupled to the first winding, a demagnetization sensor coupled to a winding core located between the first winding and the second winding and a connection circuit. The current sensor senses a first current flowing through the first winding and outputs a current sensor signal having a first state when the first current flowing through the first winding is greater than or equal to a reference value. The demagnetization sensor senses a second current flowing through the second winding and outputs a demagnetization sensor signal having a first state when the second current is substantially zero. The connection circuit is responsive to the current sensor signal and the demagnetization sensor signal. It connects the first winding to a voltage source when the demagnetization sensor signal is in the first state and disconnects the first winding from the voltage source when the current sensor signal is in the first state.

In another illustrative embodiment of the invention, a method is provided for regulating current in a current regulator having a first winding and a second winding, coupled to the first winding. The method comprises the steps of: (a) determining an amount of first current flowing through the first winding; (b) comparing the amount of first current flowing through the first winding with a reference value; (c) coupling the first winding to a voltage source when the amount of first current in the first winding is less than the reference value; and (d) decoupling the first winding from a voltage source when the amount of first current in the first winding is greater than or equal to the reference value.

In another illustrative embodiment of the invention, a method is provided for the self-oscillation of a switched current regulator having a power switch disposed in series with a current sensor between a first winding and a terminal of a voltage supply, a winding core disposed between the first winding and a second winding, a demagnetization circuit coupled to the winding core and a reference switch disposed between a terminal of a current source and ground. The method comprising the steps of: (a) determining a value of a second current flowing through a second winding; (b) closing the power switch when the second current flowing through the second winding is substantially zero; and (c) opening the reference switch when the second current flowing through the second winding is substantially zero.

The foregoing and other objects, features, aspects and advantages of the invention will become apparent from the following detailed description of the present invention when taken in conjunction with the accompanying drawings.

DETAILED DESCRIPTION

Figure 1:
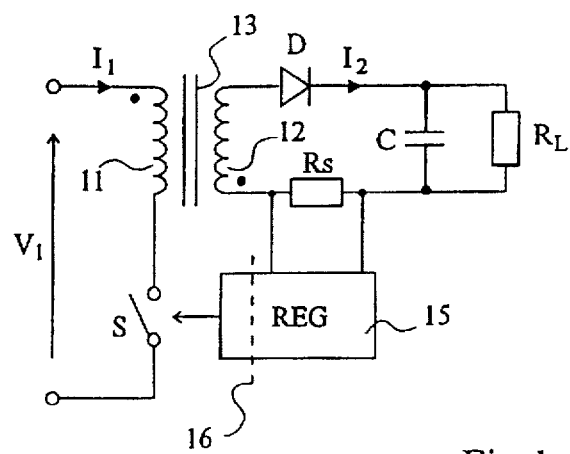
FIG. 1 above described, represents an exemplary conventional switched regulator, of the flyback type.
Figure 2:
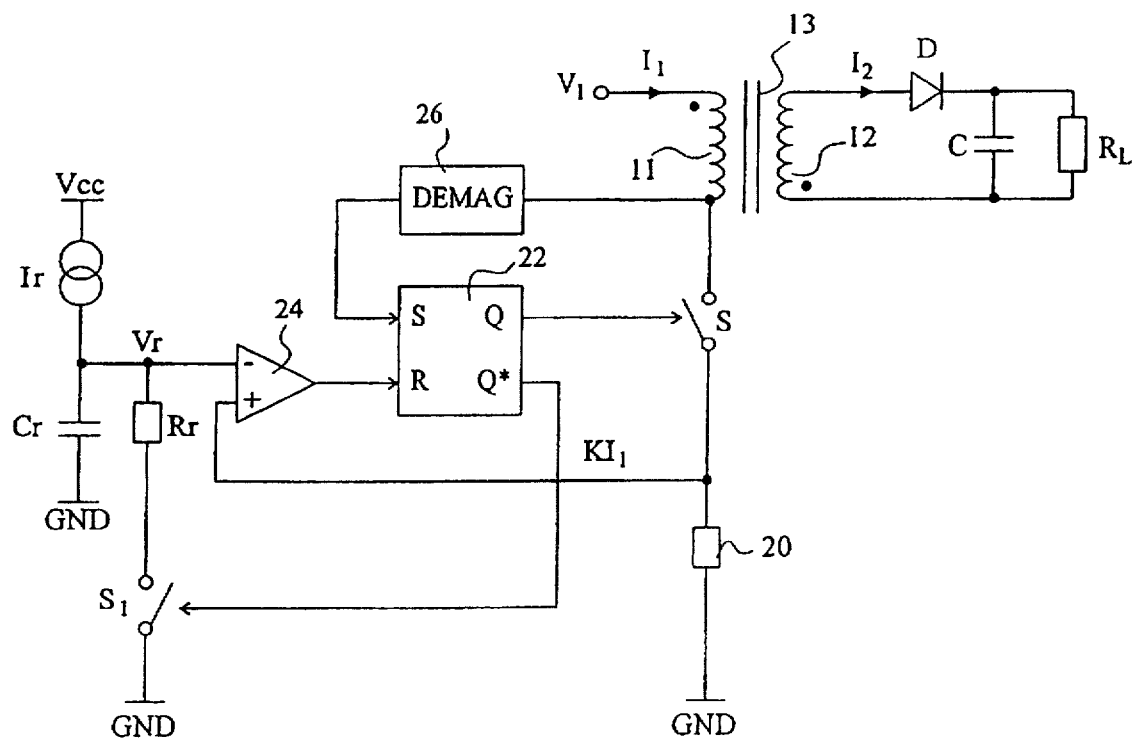
FIG. 2 represents an embodiment of a circuit for controlling a power switch in a switched current regulator according to the invention.

In FIG. 2, a current sensor 20 detects, according to the invention, the current in the first winding 11 of a converter such as the one of FIG. 1. The sensor 20 is, for example, a simple low-value resistor connected, as shown, between the power switch S and the negative terminal of the voltage source $V_1$, in this case ground GND. The current information, labeled $KI_1$, can also be provided in other ways. For example, when the power switch S is a vertical MOS transistor constituted by a plurality of cells connected in parallel, the current information can be obtained from the current flowing in a small number of cells identical to the cells of the power MOS transistor.

The switch S is controlled by the non-inverted output Q of Set/Reset-type flip-flop 22 whose Reset input "R" receives the output of a comparator 24 which compares the current information $KI_1$ with a reference voltage Vr. The Set input "S" of flip-flop 22 receives the output of a demagnetization detection circuit 26, an example of which is described hereinafter with relation to FIG. 4. The detection circuit is used so that the regulator operates in a "self-oscillating" mode, which regulates the mean current in the second winding by measuring the current at the first winding.

Figure 3:
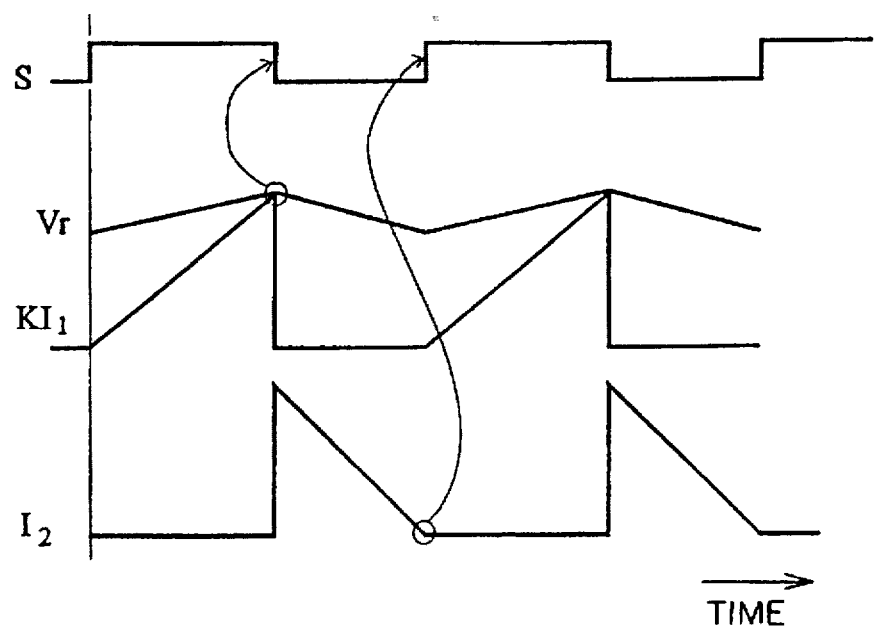
FIG. 3 represents signal waveforms of the circuit of FIG. 2.

FIG. 3 represents exemplary waveforms of the control signal of switch S, the reference voltage Vr, the current information $KI_1$, and the second current I2 in the second winding 12. The reference voltage Vr is represented with a slight variation, which will be explained hereinafter with relation to elements of FIG. 4 not described yet.

When switch S is turned on, the first current $I_1$, and therefore the current information $KI_1$, regularly increase mainly as a function of voltage $V_1$ and of the inductance of the first winding 11. During this period, the second current $I_2$ is zero.

When information $KI_1$ reaches value Vr, the comparator 24 resets the flip-flop 22, which switches off switch S. The first current $I_1$, which has just reached its peak value $I_{1p}$, is abruptly canceled while the second current $I_2$ abruptly reaches its peak value $I_{2p}$, which is equal to the peak first current $I_{1p}$ multiplied by the ratio n of the number of turns of windings 11 and 12. Thus, the peak value $I_{1p}$ is fixed to Vr/K and the peak value $I_{2p}$ is fixed to n.Vr/K. The second current $I_2$ regularly decreases, mainly as a function of the voltage across load $R_L$ and of the inductance of the second winding 12.

When the second current I2 is canceled, i.e., when the core 13 located between the first winding 11 and the second winding 12 is demagnetized, the demagnetization detection circuit 26 sets the flip-flop 22, which switches on the switch S, and so on. This operation mode, in which switch S is switched on again as soon as the second current $I_2$ in the second winding 12 cancels, is referred to as the "self-oscillating" mode.

In this self-oscillating mode, assuming that the voltage value across load $R_L$ does not significantly vary during a switching cycle of switch S (which is the case for a battery), the mean value of current $I_2$ is expressed by:

$$I_{2m} = I_{2p}(1-r)/2 = nI_{1p}(1-r)/2, \quad (1)$$

where r is the switching duty cycle of switch S.

Assuming that the supply voltage $V_1$ and the reference voltage Vr are constant, the peak value $I_{1p}$ of the first current $I_1$ is reached after a constant time duration after each switching on of switch S. The canceling duration of the second current $I_2$ varies reversely with respect to the voltage across load $R_L$. The lower this voltage is, the longer the demagnetization duration and the smaller the switching duty cycle r of switch S. Then, according to relation (1), the mean value $I_{2m}$ increases when the voltage across the load $R_L$ decreases. A power regulation effect is provided to load $R_L$, instead of a current regulation effect in load $R_L$.

To regulate the current in load $R_L$, according to an aspect of the invention, the reference voltage Vr is made to vary proportionally in the same direction as the duty cycle r, for example, 1/(1−r).

For this purpose, in FIG. 2, the reference voltage Vr is provided across a capacitor Cr having one terminal connected to ground GND and a second terminal connected to a supply voltage Vcc through a current source Ir. The supply voltage Vcc is a d.c. supply voltage of the regulation circuit and is obtained from voltage $V_1$. The reference voltage Vr is also connected to ground GND through a resistor Rr serially connected with a switch S1. Switch S1 is controlled by an inverted output Q* of flip-flop 22. Thus, switch S1 is switched with a duty cycle 1−r.

When switch S is on, switch S1 is off. A current source Ir charges the reference capacitor Cr and reference voltage Vr approaches the d.c. supply voltage Vcc. When switch S is off, switch S1 is on. Then, the reference resistor Rr derives a portion of the current from the current source Ir, and the reference voltage Vr approaches a value RrIr.

In practice, the charge and discharge durations of the reference capacitor Cr are selected high with respect to the switching period of switch S. Thus, the reference voltage Vr is practically constant, and is established at:

$$Vr=IrRr(1-r) \qquad (1)$$

The peak value of the first current $I_1$ is fixed at:

$$I_{1p}=Vr/K=IrRr/K(1-r). \qquad (2)$$

By combining equations (1) and (2), one obtains:

$$I_{2m}=nRrIr/2K,$$

which is a constant value that can be fixed by adjusting any of the values It, Rr or K.

Figure 4:
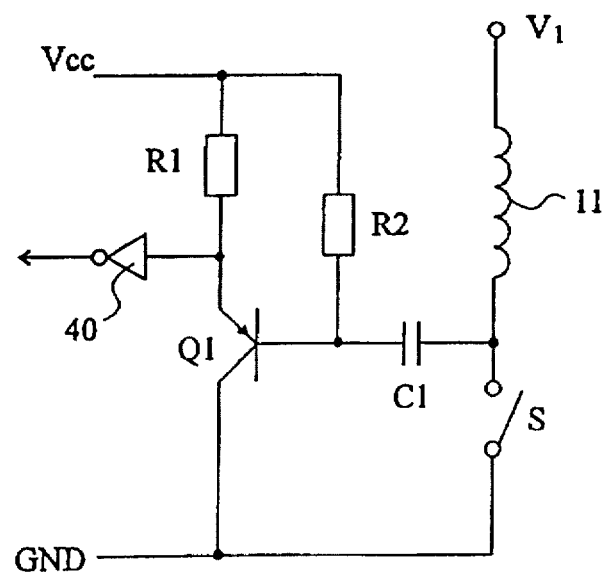
FIG. 4 represents an exemplary conventional circuit for detecting demagnetization, which is used in some flyback converters.

FIG. 4 represents an exemplary demagnetization detection circuit 26 that can be used in the regulator of FIG. 2. The circuit comprises a PNP transistor Q1 whose emitter is connected to voltage Vcc through a resistor R1 and whose collector is connected to ground GND. The base of transistor Q1 is connected to the junction between switch S and winding 11 through a capacitor C1. A resistor R2 connects the base of transistor Q1 to voltage Vcc. The demagnetization detection signal is drawn from the emitter of transistor Q1 and inverted (40) before being provided to flip-flop 22.

While switched S is on, capacitor C1 is positively charged on the side of the base of transistor Q1 at voltage Vcc. When switch S is off, the voltage across winding 11 is inverted and negatively charges capacitor C1 through resistor R2. When the second current $I_2$ is canceled, the voltage across the first winding 11 is also canceled. Then, capacitor C1 is discharged through the base of transistor Q1 and resistor R1. Transistor Q1, which was blocked hitherto, becomes conductive and connects the output of the demagnetization detection circuit to ground.

Figure 5:
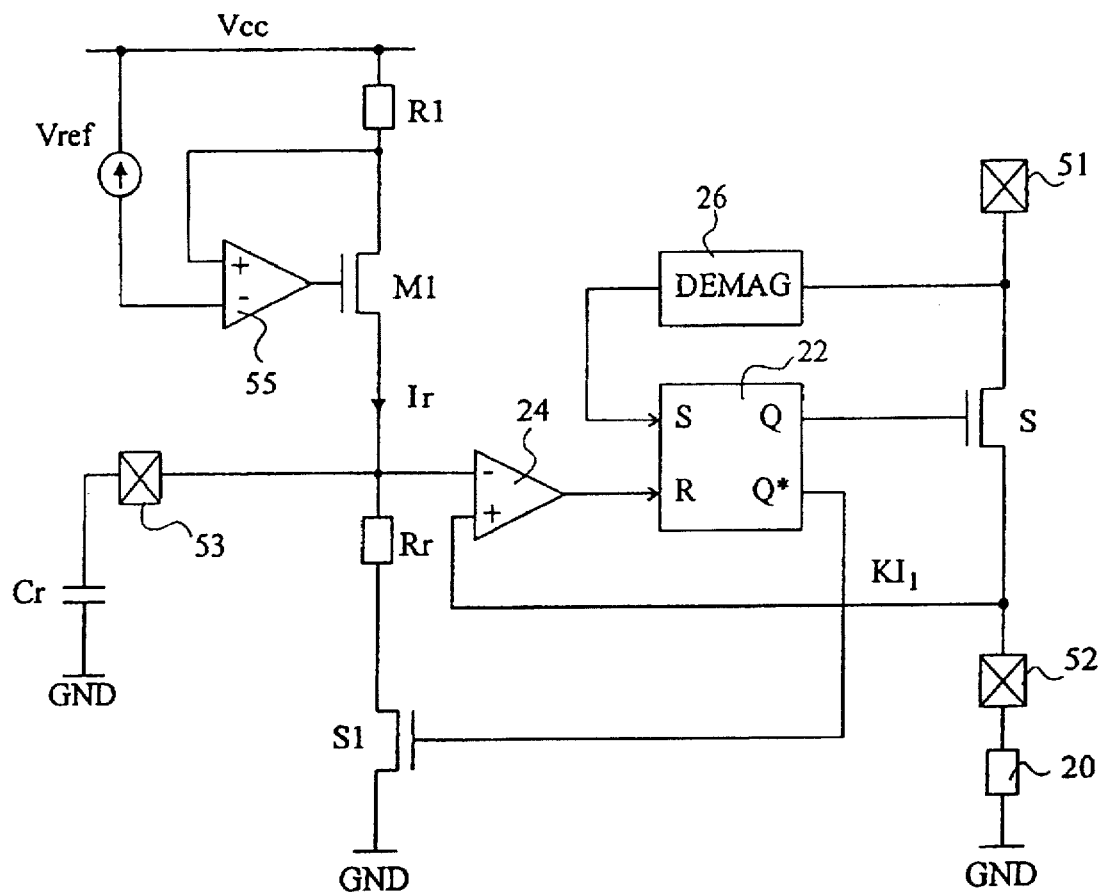
FIG. 5 represents an embodiment of the circuit of FIG. 2 which can be easily integrated in "smart power" technology.

FIG. 5 represents an embodiment of a converter according to the invention which is easily integratable in logic wells associated with vertical MOS transistors in "Smart Power" MOS technology. The first winding 11, the current measurement resistor 20, and capacitor Cr are not integrated and are connected to the integrated control circuit through respective pins 51, 52 and 53. The reference current Ir is provided by a source comprising an N channel MOS transistor M1, a resistor R1, a voltage source Vref and an operational amplifier 55. Resistor R1 is connected between the drain of transistor M1 and voltage Vcc. The reference current Ir is drawn from the source of transistor M1. Amplifier 55 controls the gate of transistor M1 and receives at its non-inverting input the drain voltage of transistor M1. The voltage source Vref is connected between the inverting input of amplifier 55 and voltage Vcc.

With this configuration, the reference current Ir is equal to Vref/R1. The exact values of resistors R1 and Rr are difficult to assert, but which is important in this case is that the ratio between resistors R1 and Rr which can be accurately selected, because the integrated resistors on a single chip are paired.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A flyback-type switched current regulator, comprising:
a first winding;
a second winding coupled to the first winding;
a current sensor, coupled to the first winding, that senses an instantaneous current flowing through the first winding and outputs a current sensor signal indicative of the instantaneous current;
connecting means for connecting the first winding to a voltage source when a second current flowing through the second winding is substantially zero;
disconnecting means for disconnecting the first winding from the voltage source when the current sensor signal indicates that the instantaneous current flowing through the first winding is greater than or equal to a variable reference value, whereby the first winding is connected to and disconnected from the voltage source according to a switching duty cycle; and
varying means, coupled to a supply voltage, for varying the variable reference value with variations of the switching duty cycle.

2. The flyback-type switched current regulator of claim 1, further comprising preventing means, coupled to the second winding, for preventing the second current from flowing in the second winding when the first winding is connected to the voltage source, and wherein the connecting and disconnecting means include:
a power switch, coupled between the first winding and a terminal of the voltage source and responsive to a control signal, which connects the first winding to the voltage source when the second current flowing through the second winding is substantially zero and disconnects the first winding from the voltage source when the instantaneous current flowing through the first winding is greater than or equal to the reference value;
a demagnetization sensor, coupled to a winding core located between the first winding and the second winding, that senses the second current flowing through the second winding and that outputs a demagnetization sensor signal having a first state when the second current flowing through the second winding is substantially zero, the second current flowing through the second winding being substantially zero when the winding core is demagnetized; and
control means, responsive to the current sensor signal and the demagnetization sensor signal, for outputting the control signal to turn the power switch off when the instantaneous current flowing through the first winding reaches said reference value and to turn the power switch on when the second current flowing through the second winding is substantially zero.

3. The flyback-type switched current regulator of claim 2, wherein the means for varying includes:
a reference capacitor having a first terminal connected to an output of a reference current source to form an intermediate node and a second terminal connected to ground;
a reference resistor, disposed in series with a reference switch between the intermediate node and ground, the reference switch being responsive to a second control signal that is complimentary to the control signal; and wherein the variable reference value corresponds to a variable reference voltage across the reference capacitor.

4. The flyback-type switched current regulator of claim 3, wherein the control means includes:
- a comparator having a first input that receives the current sensor signal, a second input that receives the reference voltage, and an output that provides a comparator signal, wherein the comparator compares the current sensor signal and the reference voltage and provides the comparator signal having a first state when the current sensor signal is greater than or equal to the reference voltage and a second state when the current sensor signal is less than the reference voltage; and
- a flip-flop having a set input coupled to the demagnetization sensor signal, a reset input coupled to the comparator output, a direct output that outputs the control signal to control the power switch and a complimentary output that outputs the second control signal to control the reference switch.

5. The flyback-type switched current regulator of claim 4, wherein the flip-flop is set and the complimentary output of the flip-flop outputs the second control signal that turns said reference switch off when the demagnetization sensor signal has the first state.

6. The flyback-type switched current regulator of claim 4, wherein the flip-flop is reset and the direct output of the flip-flop outputs the control signal that turns the power switch off when the comparator signal has the first state.

7. The flyback-type switched current regulator of claim 4, wherein the flip-flop is reset and the complimentary output of the flip-flop outputs the second control signal that turns the reference switch on when the comparator signal has the first state.

8. The flyback-type switched current regulator of claim 4, wherein the flip-flop is set and the direct output of the flip-flop outputs the control signal that turns the power switch on when the demagnetization sensor signal has the first state.

9. The flyback-type switched current regulator of claim 2, wherein the current sensor includes a resistor having a low-resistance value, that is connected between the power switch and a terminal of the voltage source.

10. The flyback-type switched current regulator of claim 2, wherein the preventing means includes a diode.

11. A switched current regulator, comprising:
- a first winding;
- a second winding coupled to the first winding;
- a current sensor, coupled to the first winding, that senses a first instantaneous current flowing through the first winding and that outputs a current sensor signal having a first state when the first instantaneous current flowing through the first winding is greater than or equal to a reference value;
- a demagnetization sensor, coupled to a winding core located between the first winding and the second winding, that senses a second current flowing through the second winding and that outputs a demagnetization sensor signal having a first state when the second current flowing through the second winding is substantially zero; and
- a connection circuit, responsive to the current sensor signal and the demagnetization sensor signal, that connects the first winding to a voltage source when the demagnetization sensor signal is in the first state and that disconnects the first winding from the voltage source when the current sensor signal is in the first state.

12. The switched current regulator of claim 11, wherein the connection circuit includes a power switch, coupled between the first winding and a terminal of the voltage source, which selectively connects the first winding to the voltage source in response to a control signal.

13. The switched current regulator of claim 12, including a varying circuit, coupled to a supply voltage, that varies the reference value with variations of a switching duty cycle, and wherein the connection circuit connects and disconnects the first winding to and from the voltage source according to the switching duty cycle.

14. The switched current regulator of claim 12, wherein the connection circuit further includes a controller, responsive to the current sensor signal and the demagnetization sensor signal, that outputs the control signal to turn the power switch off when the first instantaneous current flowing through the first winding is greater than or equal to the reference value and turns the power switch on when the second current flowing through the second winding is substantially zero.

15. The switched current regulator of claim 12, further including:
- a reference capacitor having a first terminal connected to an output of a reference current source to form an intermediate node and a second terminal connected to ground;
- a reference resistor, disposed in a series with a reference switch between the intermediate node and ground, the reference switch being responsive to a second control signal that is complimentary to the control signal; and
- wherein the reference value corresponds to a reference voltage across the reference capacitor.

16. The switched current regulator of claim 15, wherein the controller includes a comparator having a first input for receiving the current sensor signal and a second input for receiving the reference voltage, that compares the reference voltage to the current sensor signal, and has a comparator output that outputs a comparator signal that is in a first state when the current sensor signal is greater than or equal to the reference voltage and is in a second state when the current sensor signal is less than the reference voltage.

17. The switched current regulator of claim 16, wherein the controller further includes a flip-flop having a set input coupled to the demagnetization sensor and which receives the demagnetization sensor signal, a reset input coupled to the comparator output, a direct output that outputs the control signal to the power switch, and a complimentary output that outputs the second control signal to the reference switch.

18. The switched current regulator of claim 17, wherein the flip-flop is a set/reset type flip-flop.

19. The switched current regulator of the claim 17, wherein the flip-flop is reset and the direct output of the flip-flop outputs the control signal that rams the power switch off when the comparator signal is in the first state.

20. The switched current regulator of claim 17, wherein the flip-flop is reset and the complimentary output of the flip-flop outputs the second control signal that turns the reference switch on when the comparator signal is in the first state.

21. The switched current regulator of claim 17, wherein the flip-flop is set and the direct output of the flip-flop outputs the control signal that turns the power switch on when the demagnetization sensor signal is in the first state.

22. The switched current regulator of claim 17, wherein the flip-flop is set and the complimentary output of the flip-flop outputs the second control signal that rams said reference switch off when the demagnetization sensor signal is in the first state.

23. The switched current regulator of claim 11, wherein the current sensor is a resistor having a low-resistance value.

24. The switched current regulator of claim 11, wherein the current sensor signal is indicative of an instantaneous amount of the first current flowing through the first winding, and wherein the reference value varies as the voltage source is connected to and disconnected from the first winding.

25. A method for regulating current in a current regulator having a first winding and a second winding coupled to the first winding, the method comprising the steps of:
   A. determining an instantaneous amount of a first current flowing through the first winding;
   B. comparing the instantaneous amount of the first current flowing through the first winding with a variable reference value;
   C. coupling the first winding to a voltage source when the instantaneous amount of the first current in the first winding is less than the variable reference value; and
   D. decoupling the first winding from the voltage source when the instantaneous amount of the first current in the first winding is greater than or equal to the variable reference value.

26. The method for regulating current of claim 25, further comprising a step of:
   determining if a second current flowing through a second winding is substantially zero;
   and wherein the step of coupling includes connecting the first winding to the voltage source when the second current flowing through the second winding is substantially zero.

27. The method for regulating current of claim 25, wherein the step of coupling the first winding to the voltage source includes closing a power switch, disposed in series between the first winding and a terminal of the voltage source, to allow the first current to flow through the first winding.

28. The method of regulating current of claim 25, wherein the step decoupling the first winding from the voltage source includes opening a power switch, disposed between the first winding and a terminal of the voltage source, to prevent the first current from flowing through the first winding and enable a second current to flow through the second winding.

29. The method of regulating current of claim 25, including the step of varying the variable reference voltage corresponding to a switching duty cycle of the power switch.

30. The method for regulating current of claim 29, wherein the step of varying the variable reference voltage includes opening a reference switch when the second current is substantially zero, wherein the reference switch is disposed in parallel with a reference capacitor coupled to a current source, and wherein the variable reference voltage is a voltage across the reference capacitor.

31. The method of regulating current of claim 29, wherein the step of varying the variable reference voltage includes closing the reference switch, disposed in parallel with the reference capacitor coupled to a current source and wherein the variable reference voltage is a voltage across the reference capacitor, when the instantaneous amount of the first current in the first winding is greater than or equal to the variable reference value.

32. The method of regulating current of claim 25, wherein the step of comparing includes comparing the variable reference voltage with a product of the instantaneous amount of the first current flowing through the first winding and a resistor disposed between the first winding and a terminal of the voltage source.

33. The method for regulating current of claim 25, including the step of preventing a second current from flowing through the second winding when the instantaneous amount of the first current flowing through the first winding is greater than zero.

34. A method for self-oscillation of a switched current regulator having a power switch disposed in series with a current sensor between a first winding and a terminal of a voltage supply, a winding core disposed between the first winding and a second winding, a demagnetization circuit coupled to the winding core and a reference switch disposed between a terminal of a current source and ground, the method comprising the steps of:
   A. determining a value of a second current flowing through the second winding;
   B. closing the power switch when the second current flowing through the second winding is substantially zero such that a first current flows through the first winding;
   C. opening the reference switch when the second current flowing through the second winding is substantially zero to generate a variable reference signal; and
   D. opening the power switch according to the generated variable reference signal and an instantaneous amount of the first current.

35. The method for self-oscillation of claim 34, including the step of preventing the second current from flowing through the second winding when the instantaneous amount of the first current flowing through the first winding is greater than zero.

36. The method for self-oscillation of claim 34, wherein the step of opening the power switch includes opening the power switch when the first current flowing through the first winding is greater than or equal to the variable reference signal; and wherein the method further comprises a step of:
   closing the reference switch when the instantaneous amount of the first current flowing through the first winding is greater than or equal to the variable reference signal.

* * * * *